United States Patent [19]

Long

[11] 4,321,497
[45] Mar. 23, 1982

[54] PERIPHERAL CONNECTOR RING STATOR END WINDING FOR DYNAMOELECTRIC MACHINES

[75] Inventor: Lawrence J. Long, Baden, Pa.

[73] Assignee: Westinghouse Electric Corp., Pittsburgh, Pa.

[21] Appl. No.: 139,083

[22] Filed: Apr. 10, 1980

[51] Int. Cl.³ .............................................. H01R 41/08
[52] U.S. Cl. ..................... 310/198; 310/201; 310/260
[58] Field of Search ................. 310/260, 270, 198–204

[56] References Cited

U.S. PATENT DOCUMENTS

| | | | |
|---|---|---|---|
| 268,205 | 11/1882 | Edison | 310/201 |
| 1,199,097 | 9/1916 | Mueller | 310/201 |
| 2,407,935 | 9/1946 | Perfetti | 310/198 X |
| 3,014,139 | 12/1961 | Shildneck | 310/201 X |
| 3,090,878 | 5/1963 | Karlby et al. | 310/201 X |
| 3,950,665 | 4/1976 | Schneider et al. | 310/260 |
| 4,151,433 | 4/1979 | Flick | 310/198 X |

*Primary Examiner*—Mark O. Budd
*Attorney, Agent, or Firm*—William D. Lanyi

[57] ABSTRACT

The polyphase stator winding of a dynamoelectric machine consists of a plurality of coils circumscribed about one another. Each coil has at least one end turn which includes two coil sides and a C-shaped connector ring that joins the coil sides together. The coil sides are straight conductors, or ones that are slightly bent on each end, and are embedded within the stator slots and extend into the end basket region of the machine where they are joined together by the C-shaped connector rings.

4 Claims, 12 Drawing Figures

PERIPHERAL CONNECTOR RING STATOR END WINDING FOR DYNAMOELECTRIC MACHINES

BRIEF DESCRIPTION OF THE PRIOR ART AND SUMMARY OF THE INVENTION

This invention relates to dynamoelectric machines having stator members with multi-looped coils disposed therein constituting a polyphase stator winding, and more particularly to machines having C-shaped end winding peripheral connector rings.

Large dynamoelectric machine designs have evolved which use a rather complicated stator winding to handle the voltages and currents required by the loading demands made on the machine. The large number of stator slots; the use of layered windings, parallel windings in each phase, and the multiple turns per phase require a very complicated end connection that will fit in a fairly restricted space, provide rugged construction, and will also provide the necessary connections between the coils that make up the stator winding.

The present solution to this problem consists of an end basket made of "diamond-shaped" coils. Each coil's end turn is constructed from two coil sides, each of which consists of a straight portion of the coil which runs the length of the stator slot, and a complicated curved section at each end. This curved region is rather complex, in that each conductor bends axially, radially and peripherally. The manufacturing of this portion of the coil requires a complex three-dimensional form against which the conductors are bent and twisted to form the complex curve. When the stator winding is assembled, the stator coil sides are woven together in the end region of the machine to form the "diamond shaped" end region basket design that has become the standard.

The above technique of stator winding construction results in a winding that provides the necessary stator coil connections in a reasonable compact and rugged structure. However, one of the major limitations of this end-winding technique is that the interweaving of the coils makes it impossible to remove a single coil from the bottom of a stator slot without removing from twelve to eighteen additional coils.

When a machine is damaged in the field and a bottom coil must be repaired or replaced, a great deal of time, money and manpower will be expended. The repair of the bottom coil in a stator's slot involves removing the bracing from a large portion of the machine along with the slot wedging and coils from many of the other slots. In the process of unbracing the machine and removing coils, it is possible to damage the machine further. Once the machine is disassembled and repaired, the coils must be replaced and the bracing system rebuilt under field conditions which presents many problems in quality control, inspection and testing.

When machines are built with simple single phase windings, it has been known in the art to join the ends of the coil sides with arcuate conductors. Reference may be made to U.S. Pat. No. 268,205 and U.S. Pat. No. 3,176,176. It will be noted that the references referred to above are directed to the windings for a rotor or rotating armature which are single phase, single layer and generally chain type windings. In the case of more complex windings, especially multi-phase windings, in which there are two layers of equal coil sides in each slot, distributed windings and/or fractional pitch windings, the arcuate segments are an impossibility because of interference of the end turns with each other. The "diamond shape" winding, although it had limitation as described above, facilitated the connection of the coil sides for the more complex windings, especially the two layer windings that joined the top coil in one slot with a bottom coil that is in a slot across the core.

An improved multi-phase winding is disclosed in copending application Ser. No. 139,084, filed on Apr. 10, 1980, by J. S. Koroly and R. M. Sexton and assigned to the assignee of the present application. The copending application provides for a dynamoelectric machine stator winding that is made from a plurality of coil sides that are embedded in the stator slots in two layers. The top coils vary in length and are connected to the bottom coils, that are separated by a predetermined number of slots, of two involuted connector ring segments. Although this winding is a basic improvement over the "diamond shaped" winding, the field repair limitations discussed above are still a problem.

In accordance with the present invention is a dynamoelectric machine that has a polyphase stator winding comprising a plurality of stator coils circumscribed about one another; each of which is composed of at least one end turn that consists of two coil sides and a C-shaped connector ring. The coil sides are straight conductors, or ones that are slightly bent on each end and are embedded within the stator's slots in multi-layers and extend into the end basket region of the machine where they are joined together by the "C" shaped connector rings. Each C-shaped connector ring is constructed to the same specifications as the main coil body, that is to say, it is made of a material such as roebelled copper strands, water-cooled, and insulated just as the main coil body; or it may be a single conductive hollow tubing such as copper tubing provided the tubing is properly sized.

In the case of water cooled machines, only one connection between the coil sides and the C-shaped connector rings is made and it is to a water box header. This connection requires only four brazed joints per coil turn. In addition, since water flows in both the coil sides and the connector ring, only one water connection is needed between the two instead of the two required in the prior art design.

The disclosed dynamoelectric machine has a stator portion with a core member having a plurality of coils constituting a stator winding disposed in the stator core in a multi-layer fashion, each of the coils is made up of at least one end turn consisting of two coil sides that extend a predetermined axial distance from the core where a C-shaped connector ring joins the coil sides to form the complete end turn. The length of the two coil sides varies so that the coil sides that are adjacent to each other are of different lengths and interference between the C-shaped connector rings is minimized. This axial displacement of the connector rings covers up to a pole pitch depending upon the design parameters of the machine and, of course, each pole is laid out in an identical fashion.

It is shown that this type of end turn design is readily applicable to water-cooled machines as well as gas-cooled machines.

There are two embodiments of bracing systems disclosed which facilitate the implementation of this design to obtain a more rugged yet easier-to-build system than the prior art bracing systems.

Using C-shaped end turn connector rings for large dynamoelectric machines will, as a major advantage, allow easy access and repair to damaged coils in the machine. It reduces by up to 95% the number of coils that must be removed from the stator in order to access and repair a single bottom coil. In addition, there is a reduction of time, cost of coil repair, possibility of additional stator damage during the repair process, and in the need to disassemble the bracing of the machine. There is a system's cost reduction in coil fabrication since only straight coil sides and simple C-shaped connector rings which are all identical in dimension are used. The straight portion of the coils will vary slightly in length. Automatic taping machines for applying insulation may be readily used due to the simple shape of the coils. The bracing system as disclosed is simplified and made at least as rugged as the prior art complex bracing system. Faster manufacturing of replacement coils during equipment failure is made possible due to this simplified coil design. An improvement in the water distribution system by decreasing the number of inlet and outlet connections is provided for.

Many other advantages and purposes of this invention will be clear from the following detailed description of the drawings.

DESCRIPTION OF THE PREFERRED EMBODIMENT

Figure 1:
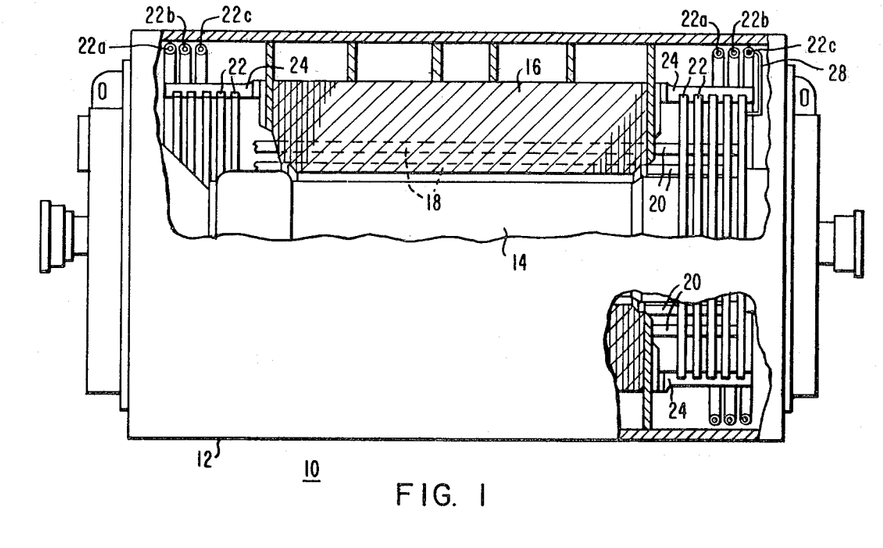
FIG. 1 is a partial sectional view of a dynamoelectric machine made in accordance with this invention.

Referring to the drawings in detail, FIG. 1 shows a partial sectional view of a dynamoelectric machine 10 having an outer housing 12, a rotor 14 and a stator 16 which has coils 18 disposed therein constituting the stator winding. Each of the coils consist of at least one end turn that includes two coil sides 20 which are embedded within the slots in layers, not shown, around the inner periphery of the stator core and are joined together with a C-shaped connector ring 22. The connector rings are held in place by means of mounting brackets 24. On each end of the stator there are three banks of parallel rings 26a, 26b, and 26c which are part of the electrical and coolant system for the conductors of the dynamoelectric machine and are connected to the coils by means of tubing 28.

Figure 2:
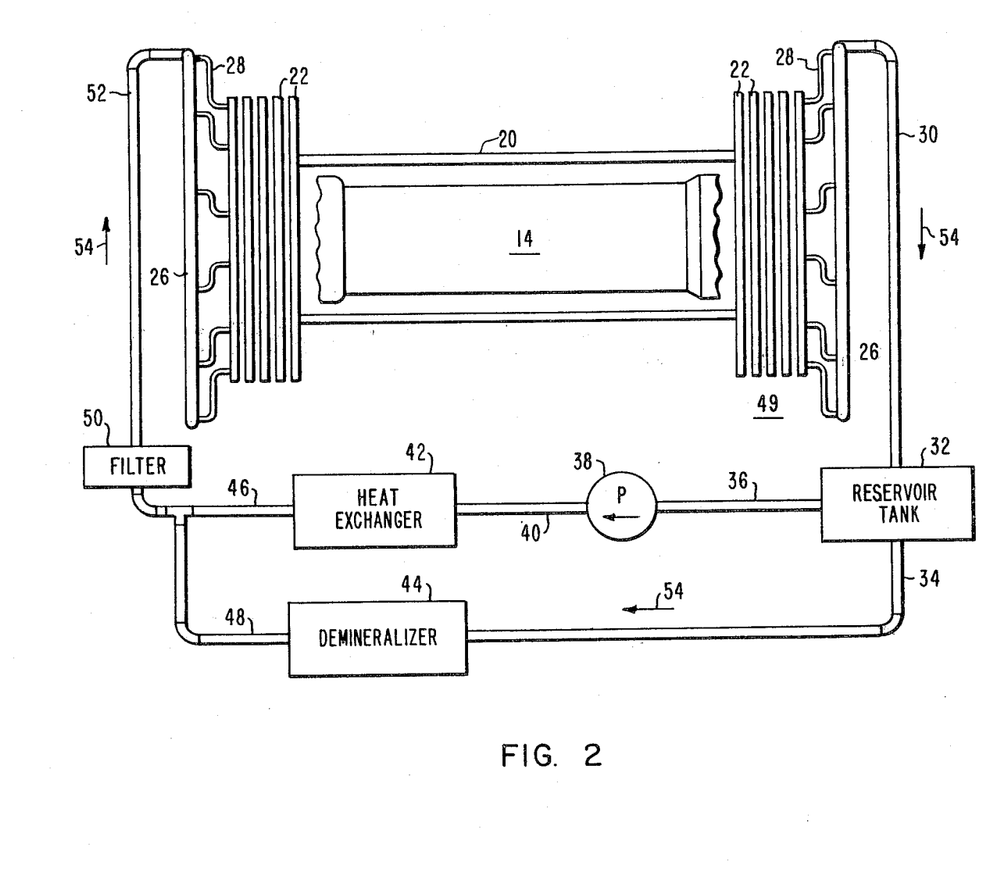
FIG. 2 is a simplified schematic diagram of a water cooling system for the dynamoelectric machine of FIG. 1.

In FIG. 2 there is shown a simplified schematic diagram of the cooling system of a large dynamoelectric machine. Reservoir tank 32 provides coolant which is coupled by conduit means 36 to pump 38. The coolant is conducted to heat exchanger means 42 by conduit 40. From the heat exchanger means 42, conduit 46 carries the coolant to filter 50. After the coolant is filtered, it is conducted to parallel rings 26, which are located within the dynamoelectric machine's housing, by means of the piping 52. The coolant is conducted from the parallel rings by tubing 28 into the C-shaped connector rings 22 which, in turn, couples the coolant through the coil sides 20 of the dynamoelectric machine. The return of the coolant to the reservoir is accomplished by tubing means 28 picking up the return fluid from the C-shaped connector rings 22 on the return end 49 of the dynamoelectric machine where it is conducted to parallel rings 26. Conduit 30 conducts the coolant back into the reservoir 32 completing the cooling loop.

A small percentage of the coolant is removed from the reservoir by means of conduit 34, where it is carried into the demineralizer 44, and from the demineralizer, conduit 48 carries the coolant back into conduit 46 where it is again circulated through the dynamoelectric machine. The demineralizer removes metal ions and particulates from the fluid to insure that it is nonconductive.

Arrows 54 indicate the direction of flow of the coolant through the dynamoelectric machine and cooling system.

Figure 3:
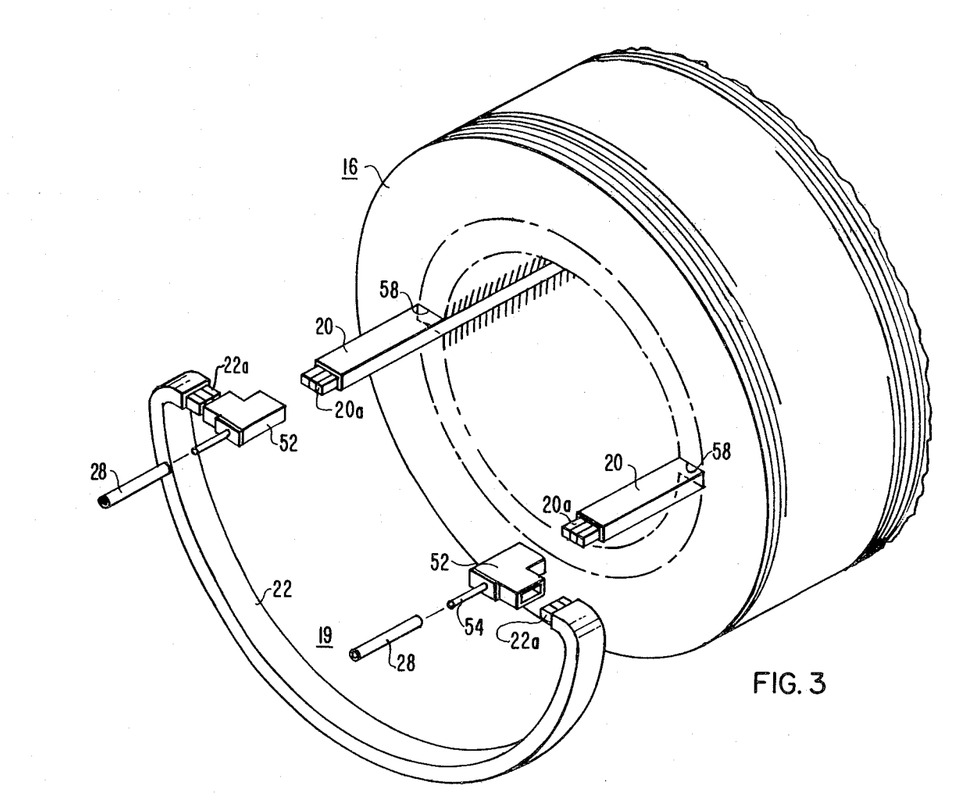
FIG. 3 is a simplified partial end view of the core of a dynamoelectric machine showing the connections for a single end turn.
Figure 4:
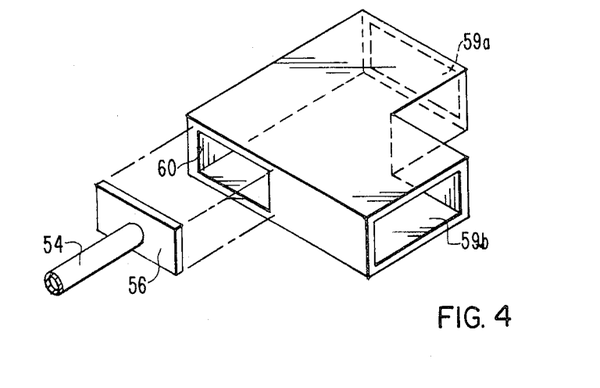
FIG. 4 is a diagram of a water block header used in the embodiment of FIG. 3.

The assembly of a single coil can readily be viewed from FIG. 3, which shows a simplified diagram of the stator 16. For simplification only two slots 58 and one end turn 19 are shown in this Figure. The header 52, as shown in FIGS. 3 and 4, provides the means for joining the straight conductors 20 to the C-shaped conductors 22, completing the end turn 19. On the ends of each leg of the header 52, there are receptacles 59a and 59b for receiving the coil strand conductors 20a and 22a. Depending upon the type of materials (copper, brass or other known conductors) used to manufacture the conductors 20a and 22a, the conductors 20a and 22a are connected to the receptacles 59a and 59b by brazing or other known techniques. It should be noted that the conductors 20a and 22a are generally shown and may be roebelled strands with ducts for cooling fluids, hollow tubing, or solid bars or other known type of coil conductor.

In the case where there is water cooling as shown in FIG. 4, header 52 can have a nipple 54 connected to a flange 56 that is placed over the opening 60. Nipple 54 is connected to the parallel rings 26 by means of tubing 28.

The flange 56 would not be connected to the header 52 and covering the opening 60 in the case where the machine is a gas cooled machine. The opening 60 would act as either an input or output manifold depending on which end of the stator, i.e., high pressure or low pressure end, it was located on.

Figure 5:
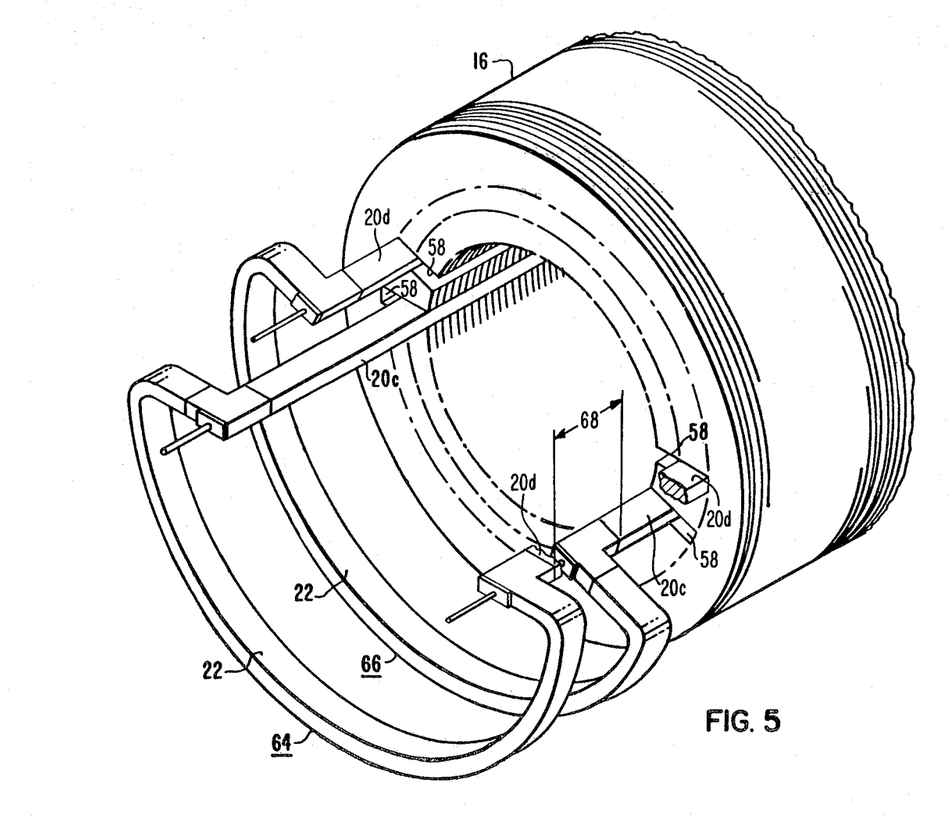
FIG. 5 is a partial view of the end region of a core of a dynamoelectric machine showing the connection between the coil sides and the C-shaped connector rings.

The placement of two coils 64 and 66 is shown in FIG. 5. Coil 64 is made up of two straight conductors 20 which are placed in slots 58 of the stator 16. The straight conductors 20 are connected together by means of C-shaped connector rings 22 thus forming one end turn 19 of coil 64 on one end of the dynamoelectric machine. On the other end there is, of course, a similar type of connection between the conductors 20 and the other conductors belonging to the winding. Coil 66 is made of two straight conductors 20 placed in slots 58 of the stator 16. The conductors 20 used for coil 66 are shorter than the straight conductors 20 used for coil 64 by an amount represented by dimension 68.

Two conductors 20 are placed in each slot 58, one in the top position and the other one in the bottom position. Top position refers to the position within the slot that is the closest to the inner periphery of the stator's bore 17 and bottom position refers to the position that is furthest from the inner periphery of the stator's bore.

It should be noted that although only two conductors per slot are shown, it is possible, with the end turn disclosed by applicant, to have a winding with multilayers of conductors per slot and not just two conductors as was the practical limitation with the "diamond shaped" end turn winding.

The conductor 22 joins a pair of conductors 20 that are separated by a predetermined number of slots. The number of slots separating the conductors depends upon the winding factor, chording or other coil winding techniques known to those skilled in the art including full pitch or fractional pitch windings.

Figure 6:
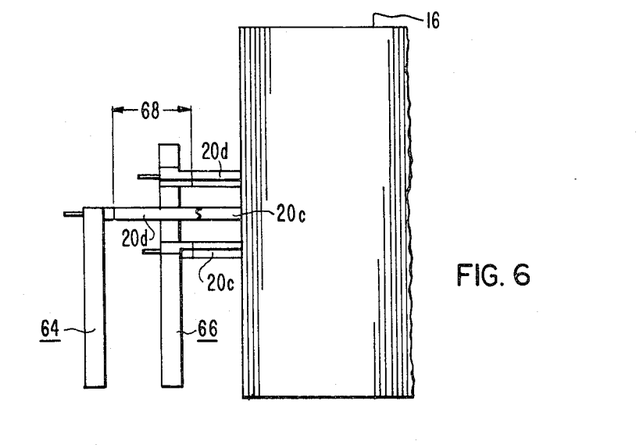
FIG. 6 is a side view of the connection of the two coils shown in FIG. 5.

In FIGS. 5 and 6, a top conductor 20c is joined to a bottom conductor 20d separated by a predetermined number of slots as discussed above.

Figure 7:
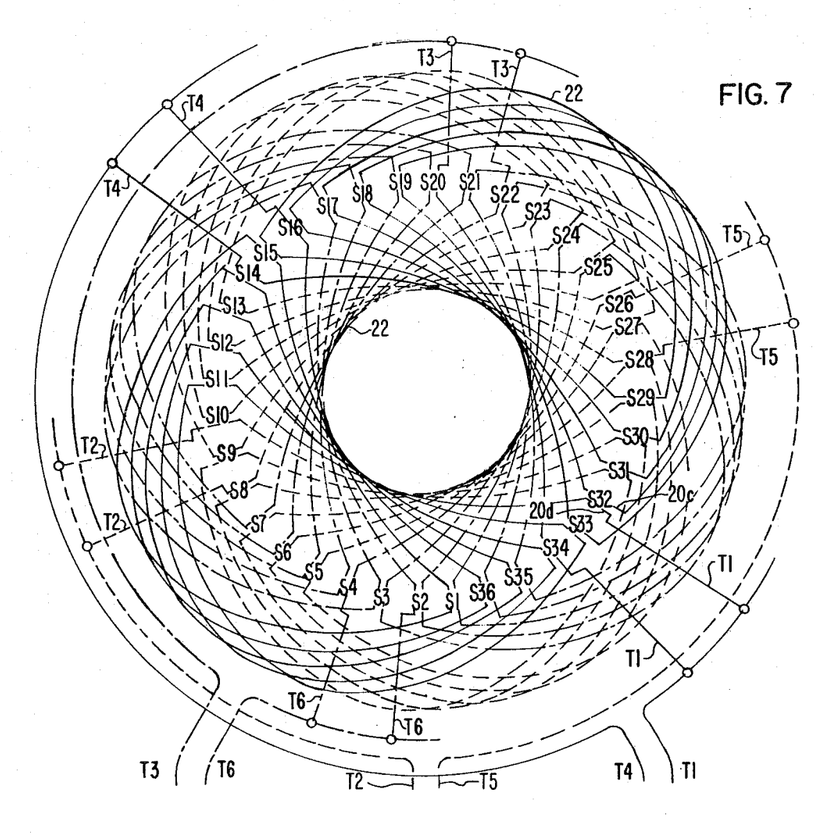
FIG. 7 is a wiring diagram of a 36 slot machine according to this invention as viewed from section line VII.

FIG. 7 is a wiring diagram of a 2 pole, 3 phase, 36 slot dynamoelectric machine as viewed from section line VII—VII of FIG. 1. The 36 slots are represented by numerals S1 through S36. The top conductors in the slots are represented by the long straight lines 20c and the bottom conductors are represented by the short straight lines 20d. T1 through T6 are the connections between the stator winding and the parallel ring bank (not shown).

The machine has a winding factor of 1 to 16. Therefore, the C-shaped conductors 22 join the top conductor of slot S1 to the bottom conductor of slot S23 on one end of the machine and the bottom conductor of slot S22 on the other end. In a similar manner all of the top conductors are joined to the bottom conductors with the exception of the coil ends which are connected to terminals T1 through T6.

Figure 8:
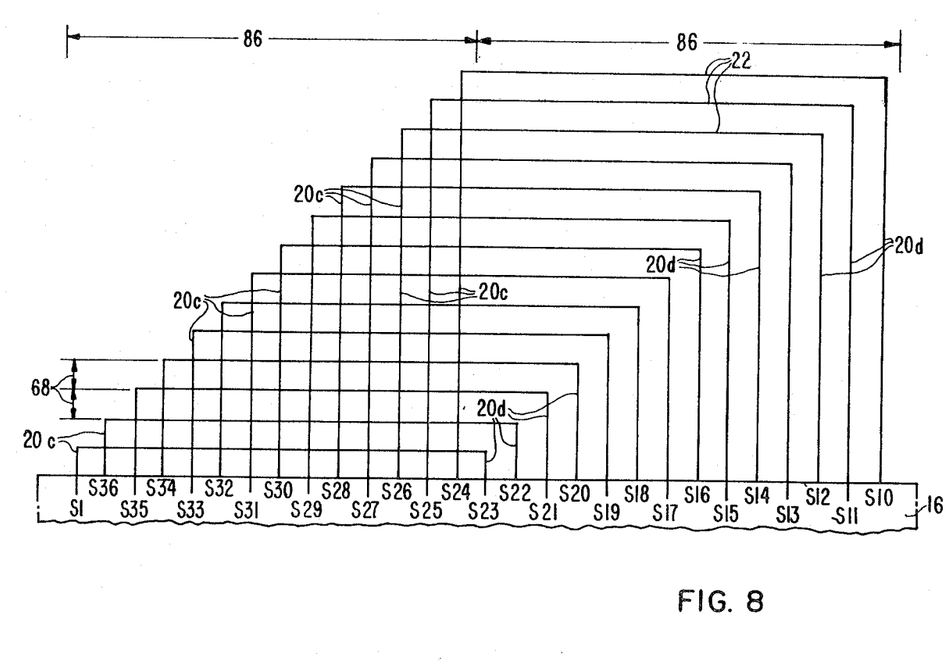
FIG. 8 is a simplified wiring diagram showing a radial view of a stator winding made in accordance with this invention.

A radial view of the stator end turn region as viewed from section line VII—VII and opened into a plane is shown in FIG. 8. For simplicity only the top coil sides 20c for one pole pitch 86 and the bottom coil sides 20d are shown. The varying lengths of both the top conductors 20c and 20d are evident and indicated at 68 as well as the coil having an end turn consisting of a top coil side, a bottom coil side and a C-shaped connector ring 22.

Figures 9, 10:
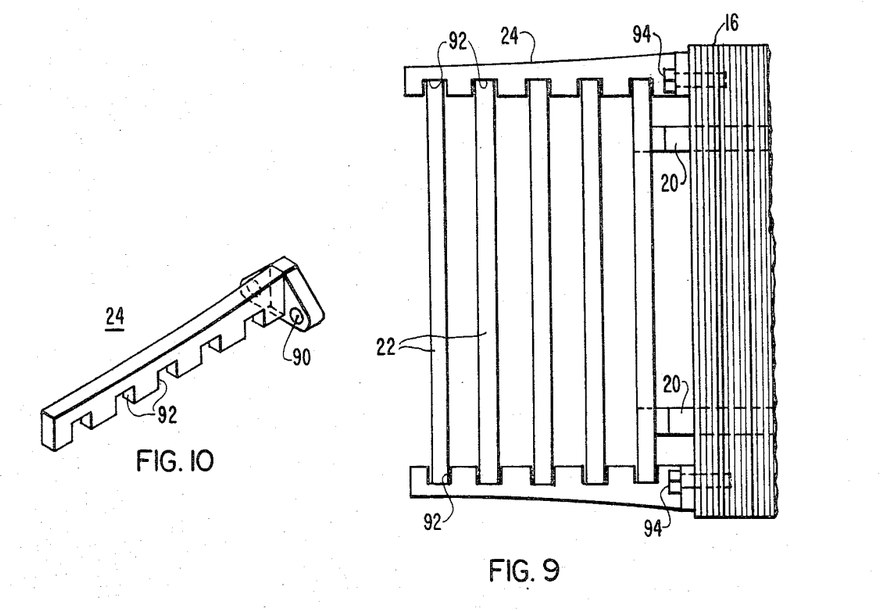
FIG. 9 is a simplified view of the end turn region of a dynamoelectric machine showing one form of connector ring bracing.
FIG. 10 is a mounting bracket used in mounting the C-shaped connector rings to the stator body as shown in FIG. 9.

One embodiment of the stator end turn region which shows bracing necessary to hold the C-shaped connector rings is shown in FIG. 9 with the bracing bracket 24 being shown in FIG. 10. The brace has a plurality of slots 92 which are designed to receive and hold the C-shaped connector rings 22. A plurality of braces are mounted around the periphery of the stator with fastener means 94 passing through both clearance hole 90 and being in threaded engagement with a threaded bolt hole (not shown) in the stator core.

Figure 11:
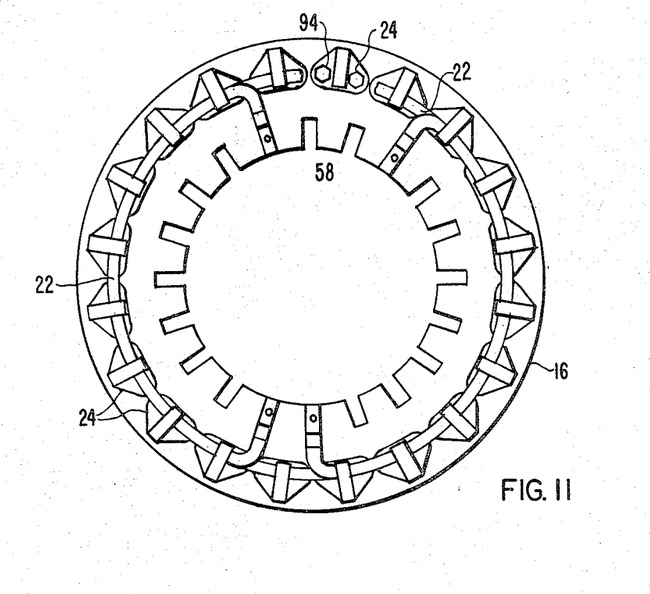
FIG. 11 is an end view of the end basket region of a dynamoelectric machine made in accordance with this invention as seen from section line VII.
Figure 12:
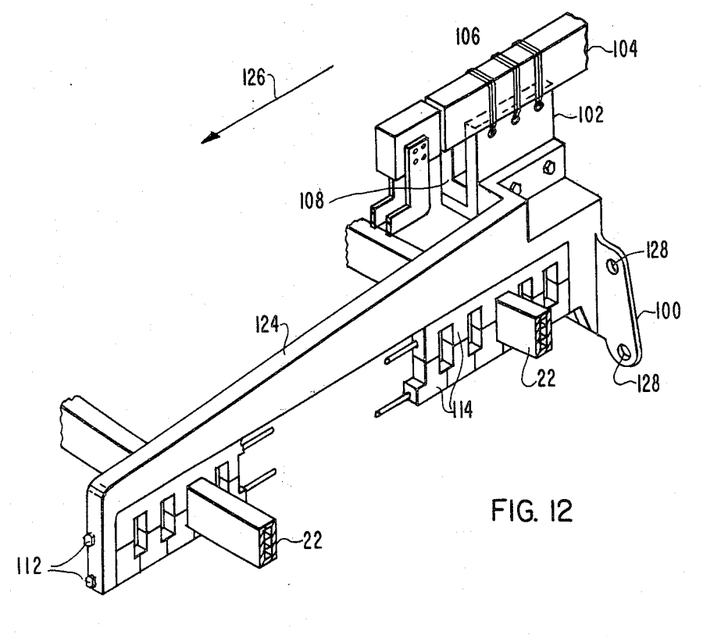
FIG. 12 is one embodiment of the mounting brackets used to mount the C-shaped connector rings to the stator body as disclosed in copending application Ser. No. 139,078, filed on Apr. 10, 1980 and assigned to the assignee of this application.

An end view of the stator end turn region as seen from section line VII is shown in FIG. 11 which shows a plurality of the bracing arms 24 around the periphery of the stator 16 which are retaining C-shaped connector rings 22.

Another embodiment of the bracing arm is disclosed in FIG. 11 and is covered by copending patent application Ser. No. 139,078 filed Apr. 10, 1980 by R. R. Srdoch and has a common assignee with this application. FIG. 11 shows a bracing arm 124 which is mounted around the periphery of a stator and its position can be referenced to arrow 26 which represents the axis of the stator. There is a mounting bracket 100 which has mounting holes 128 for connecting the bracket 124 to the stator. There is a top coil bracing block 102 which is used to mount the top coil 104 to the bracket through the lacing means 106. The C-shaped connector rings 22 are held in place with spacers 114 which are made of an insulating material such as Micarta. The spacers 114 are mounted to the bracket 124 with bolts 112. The bolts 112 pass through all of the spacers and facilitates the loosening of the brace from the C-shaped connector rings 22 by only having to remove the two fastener means 112.

The purposes served by the practice of the invention are reduced manufacturing cost, assembly time, as well as the cost and time in making repairs to the stator windings.

I claim:

1. A dynamoelectric machine having a generally tubularly shaped stator with a plurality of slots around said stator's inner periphery and a polyphase stator winding disposed therein, said stator winding comprising:

a plurality of bottom coils, each of said bottom coils being generally straight, each of said plurality of bottom coils being disposed within a preselected one of said plurality of slots, said plurality of bottom coils being associated in a generally cylindrical shape coaxial with said generally tubularly shaped stator;

a plurality of top coils, each of said top coils being generally straight, each of said plurality of top coils being disposed within a preselected one of said plurality of slots, said plurality of top coils being associated in a generally cylindrical shape coaxial with said generally tubularly stator and disposed radially inward from said generally cylindrical association of bottom coils;

a plurality of generally C-shaped connectors, each of said plurality of generally C-shaped connectors having a first terminus connectable to a preselected one of said plurality of top coils and a second terminus connectable to a preselected one of said bottom coils;

means for connecting said first terminus to said preselected one of said plurality of top coils;

means for connecting said second terminus to said preselected one of said plurality of bottom coils;

wherein each of said plurality of said bottom and top coils axially extends a preselected distance from said stator;

wherein said preselected one of said plurality of top coils and said preselected one of said plurality of bottom coils extend approximately equal preselected distances from said stator;

wherein said plurality of generally C-shaped connectors is disposed in a generally cylindrical shape, axially displaced from and generally coaxial with said stator wherein each of said plurality of generally C-shaped connectors has a radius of curvature greater than that of said generally cylindrical association of said bottom coils; and whereby said plurality of C-shaped connectors are disposed radially outward from said plurality of bottom coils.

2. The dynamoelectric machine according to claim 1 further comprising a means for circulating coolant throughout said polyphase stator winding.

3. The dynamoelectric machine according to claim 2 wherein said means for circulating said coolant throughout said polyphase stator winding further comprises:
- a hollow conductor contained within each of said coils and each of said plurality of generally C-shaped connectors;
- a plurality of headers for connecting each of said plurality of generally C-shaped connectors to said preselected top and bottom coils;
- a nipple mounted on each of said plurality of headers facilitating connecting said headers to a cooling system; and
- means for circulating said coolant through said cooling system and said polyphase stator winding.

4. The dynamoelectric machine according to claim 1 further comprising a means for bracing said C-shaped connector.

* * * * *